(12) United States Patent
Pettitt et al.

(10) Patent No.: US 7,015,942 B2
(45) Date of Patent: Mar. 21, 2006

(54) TELECINE SYSTEM FOR EXPANDED COLOR GAMUT PROCESSING

(76) Inventors: Gregory S. Pettitt, 9202 Briarcrest, Rowlett, TX (US) 75089; Bradley W. Walker, 6906 Blackwood Dr., Dallas, TX (US) 75231; Douglas J. Darrow, 761 Nicklaus Dr., Plano, TX (US) 75025; Matthew D. Cowan, 18 McAlister Lane, Bloomingdale (CA) NOB1KO ( * ) Notice: Subject to any disclaimer, the term of this patent is extended or adjusted under 35 U.S.C. 154(b) by 0 days.

(21) Appl. No.: 10/753,696

(22) Filed: Jan. 7, 2004

(65) Prior Publication Data
US 2005/0146602 A1     Jul. 7, 2005

(51) Int. Cl.
*H04N 9/47* (2006.01)

(52) U.S. Cl. .......................................... 348/96
(58) Field of Classification Search .......... 348/96–112; 345/1.1, 3.1, 590–591, 593; 382/167
See application file for complete search history.

(56) References Cited

U.S. PATENT DOCUMENTS 5,051,928 A * 9/1991 Gruters .................... 345/591
6,075,887 A * 6/2000 Brett ......................... 382/167
2002/0163676 A1 * 11/2002 Jones et al. ................. 358/505
2004/0075817 A1 * 4/2004 Agostinelli et al. .......... 353/34

FOREIGN PATENT DOCUMENTS

EP        0350870     *  1/1990

OTHER PUBLICATIONS

Schafer, R.K., "Film and high resolution electronic systems", IEE Colloquium on Film for Television—Alive or Dead, May 1991.*
Godden et al, "High performance CCD telecine of HDTV", International Broadcasting Convention, Sep. 1990.*
Poetsch, D., "Multistandard film to transfer using the CCD telecine FLH 1000", International Broadcasting Convention, Sep. 1994.*

* cited by examiner

*Primary Examiner*—Vu Le
(74) *Attorney, Agent, or Firm*—Charles A. Brill; Wade James Brady, III; Frederick J. Telecky, Jr.

(57) ABSTRACT

Disclosed is a telecine system (300) for media conversion of an original format video signal to a new format video signal. The new format video signal is displayed on at least two monitors (303, 307) having different color gamuts so that a colorist (302) can adjust the telecine process in order to produce the new format video signal such that it has acceptable image quality on both of the monitors (303, 307).

12 Claims, 3 Drawing Sheets

TELECINE SYSTEM FOR EXPANDED COLOR GAMUT PROCESSING

FIELD OF THE INVENTION

Disclosed are systems and methods for the color correction of display systems, particularly display systems using primary color based sources to generate full color images.

BACKGROUND OF THE INVENTION

Transfer and adaptation of an image or images stored on a medium is used in a variety of commercial and consumer activities. The image adaptation is designed so that the observer of a target display system perceives the image in a desired way, and most typically so that the observer perceives the image in a way that is most true to the original source of the image or that is most true to the way it would have been perceived on an original display system to which the originally stored image had been adapted.

Today, images are captured by a variety of means such as digital cameras and digital scanners. Digital cameras provide data that can be viewed on display devices such as Cathode Ray Tubes (CRT) monitors or printed onto a variety of media, most commonly paper. Digital scanners can take printed or film images and create digital data that can be displayed or reproduced onto printed media. Movies are commonly converted from film or digital data to various media for use in consumer television. Digital data can be computer-generated or generated by specially designed digital devices.

A display system recreates the complex colors and intensities for the observer. Specific media and their corresponding display systems have specific spectrum characteristics. Film has a continuous color spectrum that reproduces the image by absorbing certain colors and reflecting others. This type of display system is known as a subtractive color synthesis system. Other display systems are additive color synthesis systems because they use a light source to create and combine the colors according to their respective intensities. Additive color systems include CRTs, Liquid Crystal Displays (LCDs), Digital Micromirror Device ("DMD")-based displays, and plasma displays. These additive color systems reproduce an image by using a mixture of primary colors. The CRT and plasma displays use phosphors, which have self-luminance properties, whereas other displays such as DMDs sometimes project mixtures of white light that has been filtered down to the three primary color components. In most cases, it is desirable that the observers' perception of the reproduced image correlate to the color spectrum of the original image that is being reproduced. None of the color systems can exactly reproduce the full color range of the human eye.

Red, green and blue are used in additive systems because they combine to match the light spectra that are most readily perceived by the human eye. In a phosphor-based system, for example, the available colors of the phosphors create a limited color gamut that can be defined by a chromaticity diagram, which will be discussed below. Other additive systems have similar limitations. For instance the light of projection systems is often filtered from a white light source, and those filters and the original light source have limited spectral bands, whereby a limited color gamut also describes the capabilities of the white-light-based projection system.

A trade-off exists between the quality or "hue" of a color and its purity or "saturation" by white light. If a given set of color filters maintains a very pure color, then the brightness will be lower. Relaxing the purity and increasing the white light will provide a brighter image but may produce undesired color tints.

Converting film into other media involves many different parameters. When a movie is produced, the frame rate is conventionally 24 frames per second (fps). Correspondingly, the NTSC standard for television frames is 29.97 fps. A process known as telecine is used to convert from the "film" standard to the "video" standard. This video media could be in analog or digital form and written to Video Cassette Recorder (VCR) magnetic tape, Digital Video Disk (DVD), and computer storage medium. In the telecine process, several conversions and adjustments take place. A common telecine system converts the film media into a digital image using a Charged Coupled Device (CCD). The resolution of the image may vary but the result is that the image is now represented by a matrix of pixels. As noted, the frame rate must be adjusted. Extra frames are inserted into the output to maintain the same time sequencing. This adjustment is typically not done for DVD or PAL systems because the DVD systems typically have the capability to adjust the frame rate and the PAL system frame rate at 25 fps is more consistent with the 24 fps film or cinema standard.

The conversion of film to other media further uses a human observer, known as a "colorist," who views the content and uses equipment that is interfaced with or included in the telecine to make any color corrections based on the colorist's judgment. CRT monitors are typically used by colorists to monitor and adjust the scene as needed. A challenge in the field is posed by the variation of CRT color performance, both between different CRTs and for performance variations of a single CRT as it ages. Because of these variations, calibration of the CRTs is needed to maintain consistent performance. Further, the color gamut available through CRT monitors is less than the color gamut of newer-technology display systems on which the film to be converted may later be displayed. One such example of a newer technology, discussed later, that uses a DMD device is a Digital Light Projector (DLP) system.

The process is challenging when converting from the subtractive color system of film to the additive color systems like CRT, LCD, and DMD displays. Movies are a continuous stream of varying images, which demands close attention by the colorist, who is the human observer that adjusts the system parameters during the image conversion. For the purpose of this disclosure, the film process will be described, however, other dynamic systems can use the same techniques and systems that are disclosed below, and further, the techniques and systems described below might be applied in the context of static image adaptation.

SUMMARY OF THE INVENTION

Disclosed are systems and methods that provide for the enhanced color correction of image data during media conversion from an original media format, such as a video film or a magnetically recorded digital or analog videotape, to a new media format. Further disclosed is a process for allowing the correction of color image data for pixels in an expanded color space or color gamut. Specifically disclosed is a telecine system for image conversion and color correction, employing a DMD-based display for displaying images having a larger color gamut. Certain display systems, such as DLP Cinema™ projectors or other expanded color gamut display systems, can utilize enhanced color correction processing, which interprets the incoming luminance signal and chrominance signal components into an enhanced RGB signal that can have values that go beyond the limits of a CRT. These enhanced values are seen as negative RGB values by the CRT, which will clip the signal to a zero value. The enhanced values will thus have no effect on the CRT image that is displayed, but will allow for an expanded range of colors to be displayed on capable display systems.

The values outside of the conventional CRT color space will be referred to as "negative" RGB signals. For the RGB signals that are positive, the DLP Cinema™ projector or other expanded color space monitor will interpret the values in the same way as a CRT monitor. For the negative RGB signals, the expanded gamut display systems use their larger color gamut to display an image having enhanced colors according to these enhanced signals. Although seldom employed previously, these enhanced color signals are known in the industry, and recognition and definition of such signals are included in the ITU-R BT.709 & ITU-R BT. 1361 recommendations, which is herby incorporated by reference herein.

The disclosed process provides a method for offering control in the telecine process of the enhanced "color gamut" capabilities by use of a DLP projector or other expanded color gamut display system. Using the combination of an enhanced color gamut display system and a standard monitor, the expanded color gamut can be viewed and adjusted thereby providing the best results for an enhanced color system while maintaining compatibility with standards systems.

BRIEF DESCRIPTION OF THE DRAWINGS

"For a more complete understanding of the present invention, and the advantages thereof, reference is now made to the following descriptions taken in conjunction with the accompanying drawings, in which:"

DETAILED DESCRIPTION OF THE PREFERRED EMBODIMENTS

As described above, the color gamuts of the different display systems vary depending on characteristics of the film, phosphors in the CRT, and/or light sources in the respective systems. For evolving display systems having a broader color gamut compared to a CRT, a process is described below that allows the DLP system and other such systems to achieve their potential.

Converting color movies, whether recorded on video film or magnetically recorded analog or digital videotape, to modem digital formats is a process that lends itself to using color information outside of the standard CRT monitor color gamut. This is because modern digital formats may be used as video inputs to newly developed display systems having expanded or enhanced color gamuts or color spaces. As discussed above, film has a continuous color spectrum, whereas enhanced color-space displays have a more limited color space, but a space that is still larger than the color gamut provided in a standard CRT. To address the broader color gamut available for enhanced color space display systems while also designing converted media for standard color-space displays, embodiments disclosed in the present application provide for the monitoring and adjustment of the conversion process to accommodate both types of displays.

The process disclosed allows a colorist to adjust the image color during a film telecine process that uses the enhanced color gamut, for which the resulting corrected image can be viewed on enhanced color-space display systems, while still monitoring the process to ensure acceptable performance on standard color-space display systems.

Figure 1:
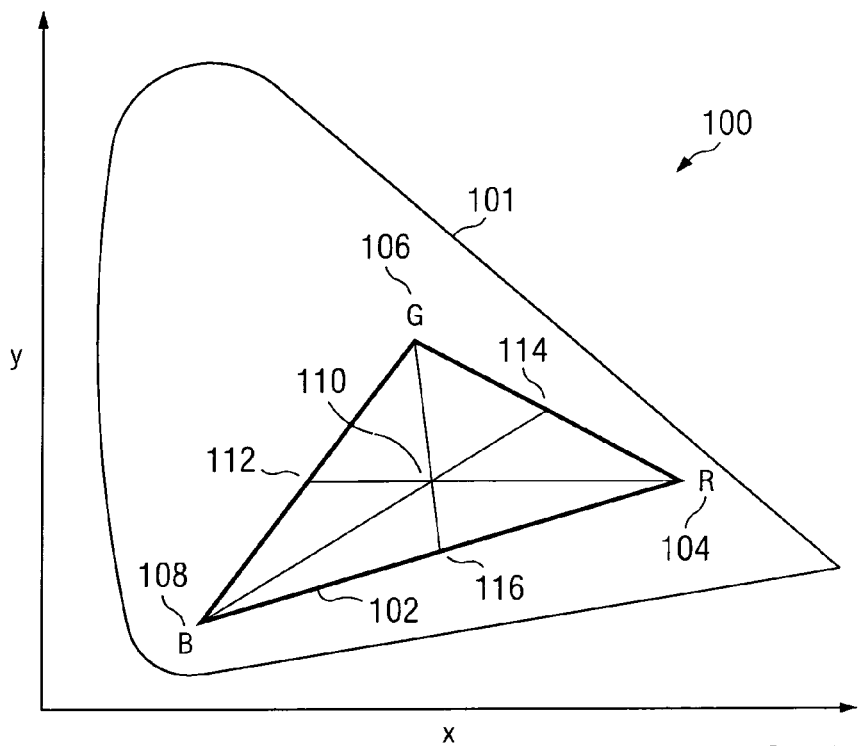
FIG. 1 is a chromaticity diagram of the color space of a first display system.

FIG. 1 is a chromaticity diagram 100 of a first display system. A chromaticity chart in this disclosure is used for comparing color gamuts. The color space 101 is the response of the human eye and is beyond replication by the color gamut of an additive color synthesis system. The color space 102 of the display system is a representation of the color gamut of a CRT system and is defined by the location of the system's red point 104, blue point 108, and green point 106, and the relative intensity of the light provided at each of these primary color points. Where the three primary colors overlap, the secondary colors, cyan, magenta, and yellow exist. The relative weight placed on the primary colors defines the secondary points. The cyan point 112, the yellow point 114, and the magenta point 116 lie on the boundary between two primary colors. Where the lines connecting the white point 110 is located, the secondary colors intersect.

Figure 2:
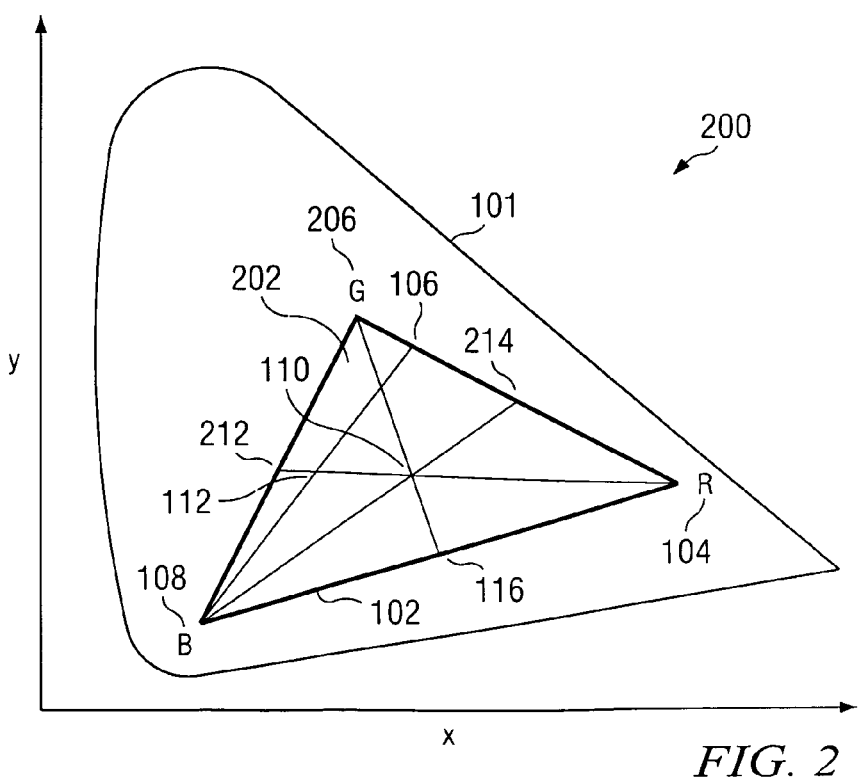
FIG. 2 is a chromaticity diagram of the color space of a second display system.

FIG. 2 is a chromaticity diagram of a second display system where the color gamut is larger than the color gamut of the first display system. A new green point 206 has moved relative to the green point 106 of first display system. The color space of the display system is representative of the color gamut of a DLP system and is defined by the location of the system's red point 104, blue point 108, and green point 206, and the relative intensity of the light provided at each of these primary color points. Additional color space 202 is available to display. An operator using only the first display system to adjust colors would not take advantage of the second display system's expanded colors and in fact could produce undesired effect on the color tint of the second display system.

The method to benefit from the expanded color gamut systems includes a display device of the second display system for observing effects of color compensation. Furthermore, the operator would have the capability to adjust parameters for colors outside of the standard color gamut of the first display system while observing the results of the correction on both display systems.

Display systems and color correction methods for using enhanced color component signals is described in further detail in commonly owned and coincidentally filed U.S. application Ser. No. 10/753,697 (TI-36055), which is hereby incorporated by reference herein in its entirety. The referenced display system can provide control over the primary (P) color points, red, green, and blue, the secondary (S) color points, cyan, magenta, and yellow, as well as the combined (W) or white point. Further, in the referenced system, the defined colors may lie in negative RGB space.

Figure 3:
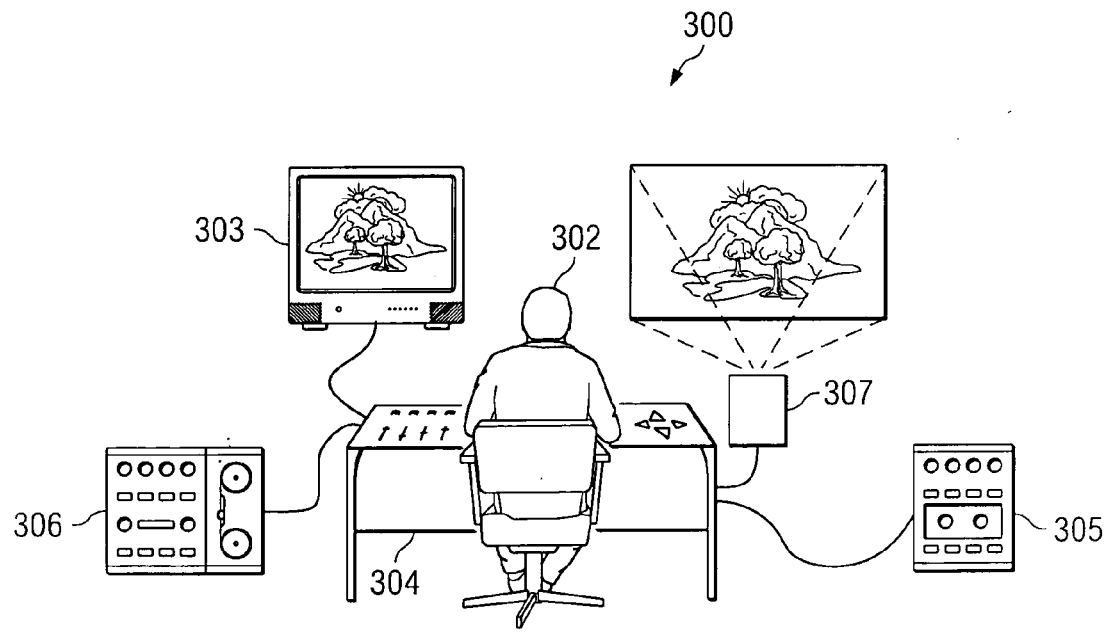
FIG. 3 is a representation of a telecine facility to transfer a film medium to video or digital media.
Figure 4:
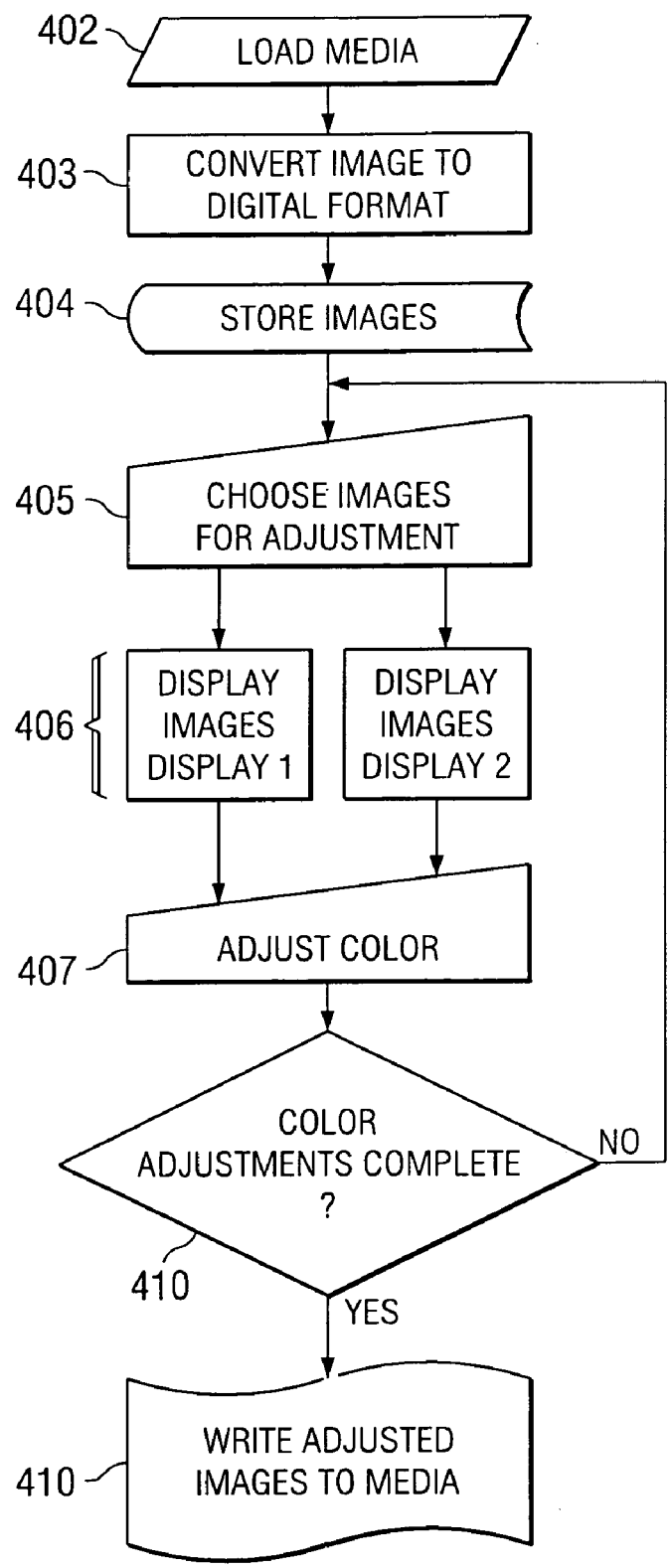
FIG. 4 illustrates the process steps of a media conversion process.

FIG. 3 illustrates a telecine system 300 that allows an operator 302 to apply the benefits of expanded color gamut correction during a format conversion process. FIG. 4 illustrates a typical workflow in a telecine facility and is provided to show how operator 302 progresses through the conversion process. A traditional telecine system would consist of a standard monitor display 303, a telecine machine 304, and the connection to a recording apparatus 305. The telecine machine would include a color correction capability that an operator would manage and adjust parameters via a control panel. Media, in this example, film, is loaded (402) in an image converter 306 and converted to a digital format (403) and stored (404) for processing. Stored images are available for the operator to access (405). Upon accessing the images, the operator observes (406) monitor 303 while using the interface on the telecine 304 to make color adjustments (407). Including the use of an expanded color gamut display system 307 would allow the operator to compensate for desired colors beyond those of a standard telecine system having only a CRT or similar standard color space monitor. Furthermore, and expanded color gamut display system, such as a DLP projector, could be equipped with additional color correction capabilities that allow for greater flexibility in adjusting the color response of the system.

Figure 5:
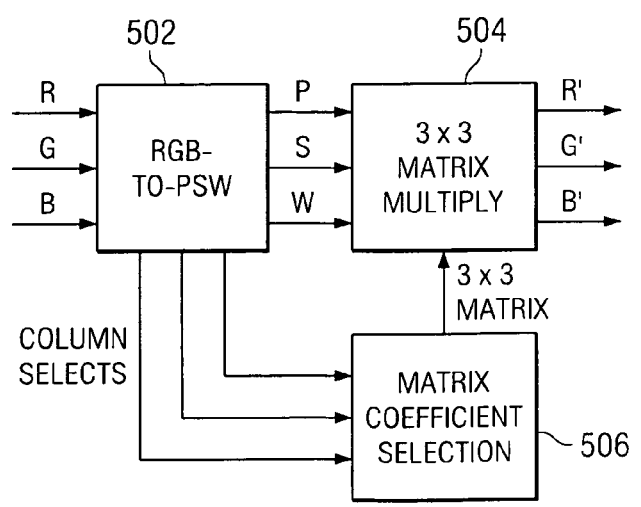
FIG. 5 is a process diagram showing the steps to selecting and calculating PSW values and selecting the matrix columns for multiplication to obtain the desired color correction.

FIG. 5 is a block diagram depicting an embodiment of an improved color correction device with negative RGB support that would be present as a subsystem in a DLP display system. In FIG. 5, RGB data for a given pixel is input into the RGB-to-PSW converter 502. The RGB-to-PSW converter 502 compares the three intensity values and outputs the greatest on signal P, the median on signal S, and the minimum on signal W. P, S, and W are then provided to one set of inputs in the 3×3 multiplier 504. The RGB-to-PSW converter 502 also drives three signals to a matrix column selection block 506. The matrix column selection block 506 provides a set of pre-selected coefficients that are used by the 3×3 multiplier 504. The output of the 3×3 multiplier 504 is the processed RGB data that, with the operation of the column section block 506, has adjusted red, green, and blue, cyan, magenta, yellow, as well as the combined (W) color independently and which also may contain negative RGB signals. For example, the magenta point 216 and the cyan point 214 may have moved in the expanded gamut, as a result of the light source or a filter. The use of the described subsystem allows the secondary point to be moved, thereby correcting for variances and creating a color stable system.

These ability of an expanded color space display system to have independent control over the color adjustment provides the display system with greater flexibility in choosing light sources and adjusting for any undesired effects of the light source or filters. A DMD-based system also provides an advantage in its stability and accuracy of color representation over time.

Viewing and adjusting color parameters using the improved color space allows the colorist to provide a consistent and improved conversion, especially for those viewing the resulting color corrected image on a display system with an expanded color gamut.

The concept can be expanded to other systems as well. Any input that can be reduced to a digital pixel representation can conceptually be used. The printing process can also provide for colors outside of the CRT color gamut. Some of the colors could conceptually be represented in a system using display system 2, thus providing for additional color correction capability.

To this point, there has been disclosed a process by which expanded color correction can be applied for a media conversion from an original format to a new format. It is not intended that the scope of this process be limited to the herein described embodiment. Furthermore, having described the embodied process, it is understood that further modification may now suggest themselves to those skilled in the art, it is intended to cover all such modification as fall within the scope of the appended claims.

What is claimed is:

1. A telecine system for conversion of an original format video signal to a new format video signal, the system comprising:

(a) a signal input for receiving the original format video signal;

(b) a conversion circuit connected to the signal input for performing a format conversion from the original format video signal to the new format video signal;

(c) a display circuit connected to the conversion circuit and operable to drive simultaneously first and second video monitors, wherein the first video monitor is operating to display a first color gamut and wherein the second video monitor is operable to display a second color gamut;

(d) a conversion adjustment circuit connected to the conversion circuit and operable to adjust parameters of the format conversion in the conversion circuit according to observed images on at least one of the first and second video monitors.

2. A system according to claim 1 wherein the original format video signal is a digital video signal.

3. A system according to claim 1 wherein the original format video signal is an analog signal.

4. A system according to claim 1 wherein the original format video signal is optically projected film.

5. A system according to claim 1 wherein a human observer observes the first and second video monitors and adjusts the parameters of the format conversion in the conversion circuit.

6. A system according to claim 1 wherein one of the first and second monitors is a CRT and the other of the first and second monitors is a DMD-based display system.

7. A system according to claim 1 wherein the conversion adjustment circuit comprises a circuit for receiving color component signals from the original format video signal and for forming therefrom adjusted color component signals according to a technique that is adapted according to at least one detected characteristic of the received color component signals.

8. A system according to claim 7 wherein received color component signals are RGB signals and wherein the at least one detected characteristic is the respective signal intensities among the R, G, and B components of the RGB signals.

9. A method for media conversion of an original format video signal to a new format video signal, the method comprising:

(a) receiving the original format video signal;

(b) converting in a conversion circuit the original format video signal to a new format video signal;

(c) displaying the new format video signal simultaneously on at least first and second monitors;

(d) observing the new format video signal as it is displayed on the first and second monitors;

(e) adjusting parameters of the conversion circuit according to the observing of the new format video signal on the first and second monitors;

(f) adjusting the new format video signal according to the adjusted parameters of the conversion circuit;

(g) displaying again the new format video signal as adjusted in the conversion circuit;

(h) repeating the observing, adjusting, and displaying again actions until the adjusted new format video signal is satisfactorily displayed on the first and second monitors; and (i) storing the adjusted new format video signal on a recording medium.

10. A method according to claim 9 and further comprising converting the original format video signal to a digital format.

11. A method according to claim 10 wherein the new format video signal during at least one portion of the observing, adjusting and displaying again actions is a video signal that is outside of the standard RGB color space for CRTs.

12. A method according to claim 11, wherein the adjusted new format video signal stored on the recording medium is a video signal that is outside of the standard RGB color space for CRTs.

* * * * *